(12) United States Patent
Bauer et al.

(10) Patent No.: US 12,285,803 B1
(45) Date of Patent: Apr. 29, 2025

(54) METHOD FOR MANUFACTURING COMBINATION OR COMPOUND GEARS

(71) Applicant: Keystone Powdered Metal Company, St Marys, PA (US)

(72) Inventors: Kevin A. Bauer, St. Marys, PA (US); Timothy E. Geiman, South Lyon, MI (US)

(73) Assignee: Keystone Powdered Metal Company, St. Marys, PA (US)

( * ) Notice: Subject to any disclaimer, the term of this patent is extended or adjusted under 35 U.S.C. 154(b) by 87 days.

(21) Appl. No.: 17/888,977

(22) Filed: Aug. 16, 2022

Related U.S. Application Data

(60) Provisional application No. 63/233,956, filed on Aug. 17, 2021.

(51) Int. Cl.
| | | |
|---|---|---|
| *B22F 3/24* | (2006.01) | |
| *B22F 3/10* | (2006.01) | |
| *B22F 5/08* | (2006.01) | |

(52) U.S. Cl.
CPC .............. *B22F 3/24* (2013.01); *B22F 3/1007* (2013.01); *B22F 5/085* (2013.01); *B22F 2003/247* (2013.01); *B22F 2201/30* (2013.01)

(58) Field of Classification Search
CPC ... B22F 2003/247; B21K 1/30; F16H 55/065; Y10T 29/49462; Y10T 29/49467; Y10T 29/49478
See application file for complete search history.

(56) References Cited

U.S. PATENT DOCUMENTS

| | | | | |
|---|---|---|---|---|
| 766,245 | A * | 8/1904 | Hardinge | B23F 23/08 |
| | | | | 451/147 |
| 2,357,153 | A * | 8/1944 | Wildhaber | B23F 1/083 |
| | | | | 409/53 |
| 3,100,333 | A * | 8/1963 | Friend | B23P 15/14 |
| | | | | 29/520 |
| 5,659,955 | A * | 8/1997 | Plamper | B21H 5/02 |
| | | | | 72/98 |
| 5,996,229 | A * | 12/1999 | Yang | B22F 5/085 |
| | | | | 72/355.6 |
| 6,440,357 | B1 * | 8/2002 | Hinzmann | B22F 3/03 |
| | | | | 425/78 |

(Continued)

OTHER PUBLICATIONS

Danninger (Year: 2017).*

*Primary Examiner* — Ricardo D Morales
(74) *Attorney, Agent, or Firm* — Alvin T. Rockhill

(57) ABSTRACT

The present invention provides a method of manufacturing combination gears and compound gears having challenging geometries using powder metal technology. This method allows for the production of combination gears and compound gears having any combination of straight or helical gear faces even in cases where the smaller gear intersects the flange of the larger gear creating an inside corner. The subject invention more specifically relates to a method for manufacturing a combination gear or a compound gear having a larger diameter gear face and a smaller diameter gear face, said method comprising molding a powder metal composition into a green preform having the smaller diameter gear face and a larger diameter cylindrical blank face, and subsequently machining the larger diameter cylindrical blank face into the larger diameter gear face.

9 Claims, 3 Drawing Sheets

(56) References Cited

U.S. PATENT DOCUMENTS

| | | | |
|---|---|---|---|
| 6,446,523 B1* | 9/2002 | Ota | F16H 55/17 |
| | | | 74/665 F |
| 2004/0049919 A1* | 3/2004 | Puetz | B23P 15/14 |
| | | | 29/893 |
| 2013/0213168 A1* | 8/2013 | Buchleitner | B22F 5/08 |
| | | | 74/445 |

* cited by examiner

Gear Hob

Process of Gear Hobbing

METHOD FOR MANUFACTURING COMBINATION OR COMPOUND GEARS

This application claims the benefit of U.S. Provisional Patent Application Ser. No. 63/233,956, filed on Aug. 17, 2021. The teachings of U.S. Provisional Patent Application Ser. No. 63/233,956 are incorporated by reference herein in their entirety.

BACKGROUND OF THE INVENTION

Powder metal parts can typically be produced in high volume at a cost which is lower than the cost of manufacturing the part with wrought steel and subsequently machining or otherwise working the parts to desired dimensions. This is because powder metal technology can eliminate a substantial amount of the labor which is required to machine the part to attain the desired geometry. In some cases, desired shapes can only be made in a commercially viable manner by using powder metal technology because producing the desired geometric shape of the part by machining is difficult or impossible. For instance, manufacturing combination gears or compound gears cost-effectively in one piece by traditional gear cutting methods can be challenging in cases where the smaller gear intersects the flange of the larger gear creating an inside corner. This geometry limits clearances for the gear cutting tooling and requires that a more expensive gear cutting method, such as shaping, be used for the smaller gear as opposed to less expensive techniques, such as hobbing, which can be used for the larger gear.

It is possible to manufacture both larger and smaller gears separately by hobbing or another cost effective technique and then to subsequently join the larger and smaller gears together to make the combination or compound gear. However, additional cost is incurred to machine joint surfaces and in fastening them together. Additionally, gear performance specifications may not be capable of being met in cases where a high degree of dimensional precision is required between the two gears. Furthermore, gears of this two-piece design may have inadequate strength at the joint between the two gear sections to provide for the transmission of high levels of torque that may be required in desired applications.

Powder metal technology can be readily used in manufacturing combination gears in one piece by axial compaction in a fast and economical manner in cases where (1) both gears are spur gears, (2) both gears are helical gears with the same helix angle and direction, (3) the two gears are different, but there is an adequate difference in the diameters of each gear to allow independent and robust tooling for each, and (4) the two gears are different and do not have an adequate difference in diameter, but have the same helix direction and lead. However, conventional powder metal technology cannot readily be utilized in manufacturing combination gears or compound gears which fall outside of these parameters. For instance, powder metal combination gears of different gear types and minimal diameter differences cannot be easily or economically manufactured.

In general, powder metal parts, such as gears, are made utilizing a process that in its simplest form involves compacting metal powder under high pressure in a mold to make a green metal part. The green metal part has little strength and is very brittle since the individual metal particles in the green metal article are not bonded together. Accordingly, to provide the green article with strength and durability the green article is sintered at an elevated temperature. The temperature at which the article is sintered is under the melting point of the metal yet high enough to result in the metal particles of the part bonding together by diffusion rather than by melting and re-solidification. The sintered metal part can then subsequently be finished using a variety of methods to attain desired characteristics. For instance, the sintered part can optionally be further worked by sizing, machining, shaving, hobbing, broaching, heat treating, carburizing, quenching, tempering, grit blasting, shot blasting, grinding, honing, forging, or the like to attain a final product with the desired characteristics.

There has been a long felt need for a method of manufacturing combination gears and compound gears having challenging geometries using powder metal technology. Such a method would desirably allow for the production of any combination of straight or helical gears even in cases where the smaller gear intersects the flange of the larger gear creating an inside corner. Such technology would provide a low cost means for manufacturing such gears utilizing conventional equipment and procedures. It is also, of course, important for such gears to be of high precision, uniform, strong, durable, and to be capable of meeting more and more stringent performance requirements. Such gears should provide a long service life without failure and without compromising part tolerances and uniformity. It is, of course, also important for such parts to be capable of being manufactured using commercially viable techniques that can be implemented at a lower overall cost by replacing expensive labor intensive machining procedures with powder metal technology.

SUMMARY OF THE INVENTION

The present invention provides a method of manufacturing combination gears and compound gears having challenging geometries using powder metal technology. This method allows for the production of combination gears and compound gears having any combination of straight or helical gear faces even in cases where the smaller gear intersects the flange of the larger gear creating an inside corner. The method of this invention provides a low cost means for manufacturing such gears utilizing conventional equipment and procedures. The method of this invention can also be used in manufacturing combination gears and complex gears which are of high precision, uniform, strong, durable, and capable of meeting more and more stringent performance requirements. Gears which are made in accordance with this invention are also capable of providing a long service life without failure and without compromising part tolerances and uniformity. The method of this invention can also be implemented at a lower overall cost by replacing expensive labor intensive machining procedures with powder metal technology. In other words, the method of this invention minimizes or at least reduces the level of labor intensive machining procedures required in manufacturing combination gears and compound gears having challenging geometric designs.

The method of this invention offers the specific advantages of utilizing powder metal technology to provide a lower cost option for forming the smaller diameter gear face or spline in combination or complex gears. In using the method of this invention undercuts which are necessary for cutting the smaller diameter gear can be avoided which results in a stronger gear with a shorter axial length. The process of this invention can also be used to improve precision, such as concentricity and clocking between the two gear forms as compared to two piece assemblies.

Finally, hobbing of the larger gear enables any combination of straight or helical gear faces to be formed which extends the application of the powder metal process.

The subject invention more specifically relates to a method for manufacturing a combination gear or a compound gear having a larger diameter gear face and a smaller diameter gear face, said method comprising molding a powder metal composition into a green preform having the smaller diameter gear face and a larger diameter cylindrical blank face, and subsequently machining the larger diameter cylindrical blank face into the larger diameter gear face. In this method the larger diameter cylindrical blank face can be machined to form the larger diameter gear face either before or after the green preform is sintered. It is normally preferred for the large diameter cylindrical blank gear face to be machined by hobbing to form the larger diameter gear face.

Figure 1:
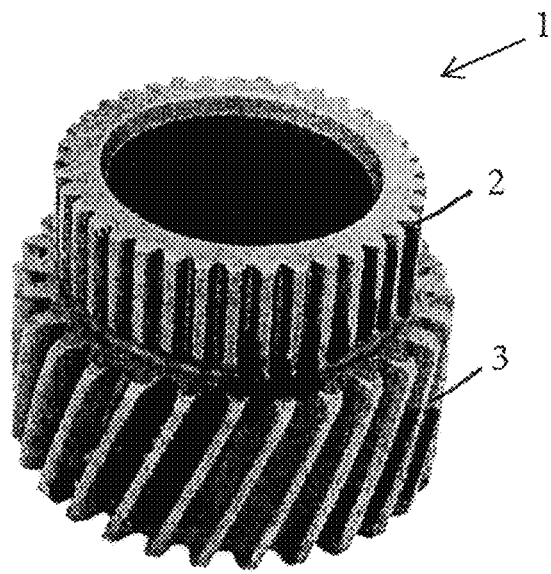
FIG. 1 illustrates a combination gear having a smaller diameter gear face and a larger diameter gear face, wherein the smaller diameter gear has a spur gear face and wherein the larger gear has a helical gear face.

It should be understood that various aspects of the subject invention are presented in the Figures which may not be drawn to scale and which are not intended to be limiting with respect to the scope of the invention now being claimed. Like components which are illustrated in different drawings are not necessarily numbered using like reference numerals.

DETAILED DESCRIPTION OF THE INVENTION

Figure 2:
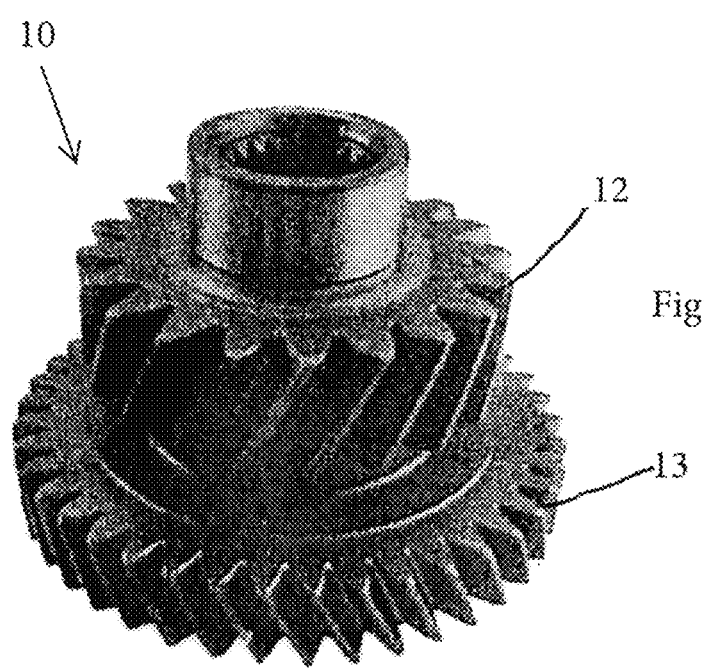
FIG. 2 illustrates a combination gear having a smaller diameter gear face and a larger diameter gear face, wherein the smaller diameter gear has a helical gear face and wherein the larger gear has a spur gear face.

The present invention will now be described in terms of the method which it employs in manufacturing combination gears and compound gears having a larger diameter gear face and a smaller diameter gear face having challenging geometries using powder metal technology. FIG. 1 illustrates a combination gear 1 having a smaller diameter spur gear face 2 and a larger diameter helical gear face 3. The terms "smaller diameter" and "larger diameter" are relative terms which denote that one of the gear faces on the combination or compound gear is smaller with the other one being larger relative to each other. In any case, this geometer cannot be made on a commercially viable basis using conventional powder metal technology. FIG. 2 illustrates a combination gear 10 having a smaller diameter helical gear face 12 and a larger diameter spur gear face 13. Again, this geometer having a helical gear face and a spur gear face cannot be made on a commercially viable basis using conventional powder metal technology. Combination gears having helical gear faces with different helix angles and/or helix directions are also not viable for production with powder metal technology because they cannot be removed from conventional molds after being compacted into a green preform.

Figure 3:
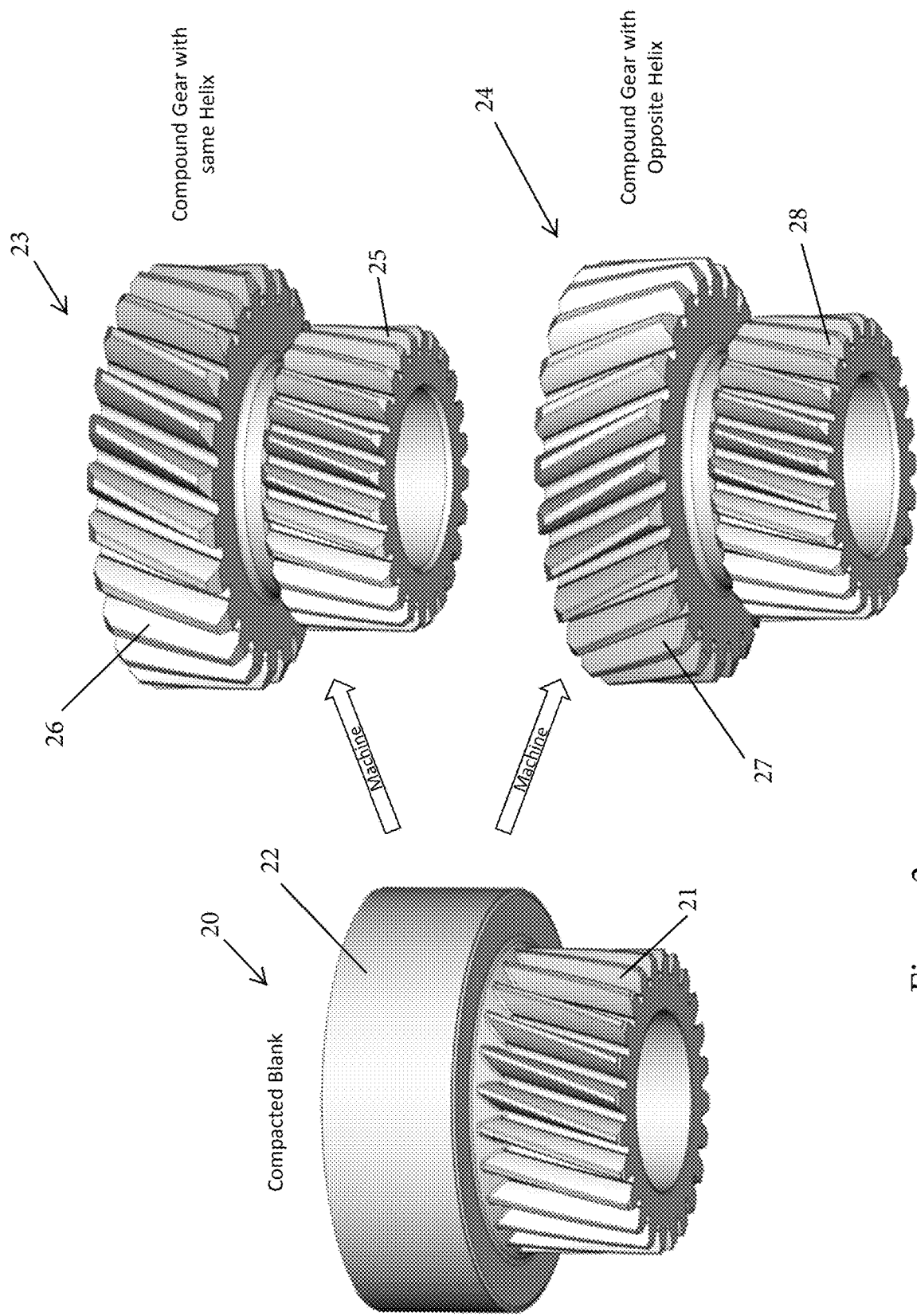
FIG. 3 illustrates a green preform having a smaller diameter gear face and a larger diameter cylindrical blank face wherein the larger diameter blank face can be machined into compound gear wherein the gear faces have the same helix angle or opposite helix angles.

FIG. 3 shows a compacted blank 20 which can be a green preform or a sintered preform having a smaller diameter gear face 21 and a larger diameter cylindrical blank face 22 wherein the larger diameter blank face 22 can be machined into a compound gear wherein the gear faces have the same helix angle 23. In other words, the larger diameter blank face 22 can be machined into a larger diameter gear face 26 having the same helix angle as the smaller diameter gear face 25. In another embodiment of this invention the larger diameter blank face 22 can be machined into a larger diameter gear face 27 having the opposite helix angle as the smaller diameter gear face 28. It is normally preferred for the compacted black blank 20 to be a green preform to facilitate machining of the larger diameter cylindrical blank face 22. In other words, it is typically preferable to machine the compacted blank 20 before it is sintered. This is because machining the green metal preform 20 is normally faster, requires less energy, and subjects equipment to less wear and tear. However, the compacted blank 20 can also optionally be machined after it has been sintered.

The practice of the subject invention allows for the production of compound and combination gears having any combination of straight or helical gears faces even in cases where the smaller gear intersects the flange of the larger gear creating an inside corner. Accordingly, combination gears having the geometries illustrated in FIG. 1 and FIG. 2 can be easily and economically made on a commercial basis using the method of this invention. It should be further noted that combination gears having helical gear faces with different helix angles and/or helix directions can also be easily made in accordance with the method of this invention. In such combination gears the smaller gear can also intersect the flange of the larger gear creating an inside corner.

In the first step of the method of this invention involves molding a powder metal composition into a green preform having the smaller diameter gear face and a larger diameter cylindrical blank face. The green preform is made by compacting the powder metal composition in a mold under a high pressure which is typically within the range of 20 tsi to 70 tsi (tons per square inch) and is preferably within the range of 40 tsi to 60 tsi. The mold will be of a design that results in the formation of an uncured or green preform having the desired smaller diameter gear face and the desired larger diameter cylindrical blank face. After being removed from the mold the larger diameter gear face of the green metal preform can then be machined into a gear face of the desired geometry. In other words, it can be of the same helix angel, a different helix angle, or of the opposite helix angle. In one embodiment of this invention a combination gear can be made which has a smaller diameter gear face and a larger diameter gear face, wherein the smaller diameter gear has a spur gear face and wherein the larger gear has a helical gear face. In another embodiment of this invention a combination gear can be made which has a smaller diameter gear face and a larger diameter gear face, wherein the smaller diameter gear has a helical gear face and wherein the larger gear has a spur gear face. After being machined the green preform is subsequently cured or sintered by heating the entire green preform in a sintering furnace, such as an electric or gas-fired belt or batch sintering furnace, for a predetermined time at high temperature in a protective atmosphere, such as under nitrogen, hydrogen, or argon. In any case the metal powder is sintered in the solid state with bonding by diffusion rather than melting and re-solidification.

In another embodiment of this invention, the green preform is removed from the mold and subsequently sintered to make a sintered preform. The larger diameter cylindrical blank face of the sintered preform is then subsequently machined into the desired geometry to make finished part.

The metal powders that can be utilized in manufacturing the gears of this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together with other additives as desired to attain needed results, such as lubricants and graphite, and molded as a mixture. A second possibility is to use various alloyed powders, such as an iron-nickel-molybdenum-copper steel or iron-chromium-molybdenum-copper steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder, including copper, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used as long metal composition expands during sintering to a greater degree than does the metal utilized in the outer component of the part. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, nickel, silicon, chromium, and, of course, copper.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2/kg$), while hydrogen-reduced sponge iron typically has a surface area of approximately 200 $m^2/kg$. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the preform for the inner component of the toroidal part being manufactured.

A more detailed description of metal powder compositions that can be used in the practice of this invention is given in U.S. patent application Ser. No. 14/974,498, filed on Dec. 18, 2015 (now issued as U.S. Pat. No. 11,850,662 B2). The teachings of U.S. patent application Ser. No. 14/974,498 (now issued as U.S. Pat. No. 11,850,662 B2) are incorporated herein by reference in their entirety. In any case, the metal powder composition used will normally include at least 2.5 weight percent to 5 weight percent copper and will frequently contain from 3 weight percent to 4 weight percent copper. In many cases, the metal powder composition will also contain from 0.2 weight percent to 1.5 weight percent molybdenum and from 0.2 weight percent to 4 weight percent nickel. In some cases it is advantageous for the metal powder composition to include from 0.1 weight percent to 2 weight percent graphite in addition to the copper.

The powder metal preform is subsequently sintered. The green metal preform can be sintered either before or after the larger cylindrical blank face is machined to form the larger diameter gear face. It is easier to machine the larger cylindrical blank face before the green metal preform is sintered. More specifically, it is faster, requires less energy, and causes less wear and tear on equipment. However, a higher quality gears with better tolerances and uniformity can typically be made by machining the larger cylindrical blank face after sintering the green preform. In any case, sintering is typically done by placing the green preform in a sintering furnace where it is sintered at a temperature which is about 60% to about 90% of the melting point of the metal composition being employed. The sintering temperature will normally be in the range of 1700° F. (927° C.) to 2450° F. (1343° C.). The sintering temperature for the iron based compacts normally utilized in the practice of this invention will more typically be within the range of 2000° F. (1093° C.) to about 2400° F. (1316° C.). In any case, the appropriate sintering temperature and time-at-temperature will depend on several factors, including the chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at 2000° F. to 2450° F. for approximately 20 minutes under a protective atmosphere to sinter the metal. In any case, the sintering step with be conducted for a time and under conditions which allow for a metallurgical bonds to form between the external component and the internal component of the part.

As previously noted, the sintering temperature will typically be within the range of 2000° F. (1093° C.) to 2400° F. (1316° C.) and may be, for example, within the range of 2050° F. (1121° C.) to 2100° F. (1149° C.) for many iron-based preforms. Depending on, for example, the type of powder metal and the desired article, the sintering temperature can vary. After being sintered in the furnace the toroidal part is normally cooled to room temperature.

Figure 4:
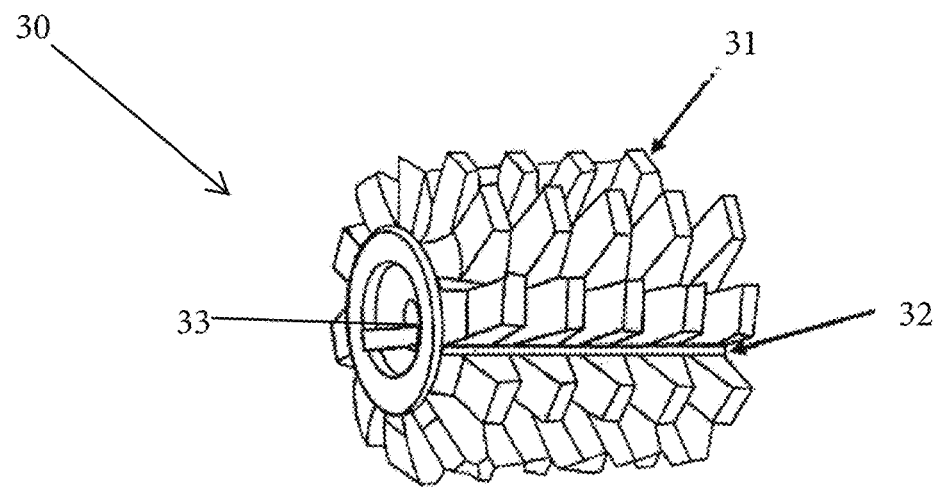
FIG. 4 illustrates a typical gear hob.
Figure 5:
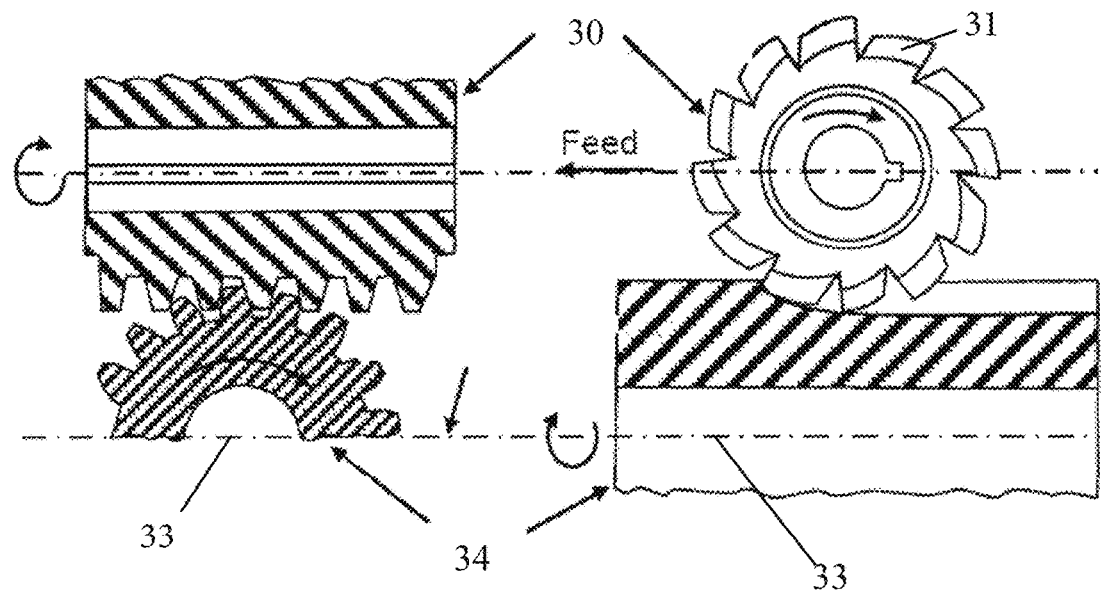
FIG. 5 illustrates a typical gear hobbing process.

The larger diameter cylindrical blank face can be machined to form the desired gear face using any appropriate method, including but not limited to hobbing, milling, or disc cutting. However, it is typically preferred for this to be accomplished by hobbing. In such a hobbing step the larger diameter cylindrical blank is rolled with a rotating cutter (the hob). Such a hob 30 having cutting teeth 31 and straight flutes (gashes) 32 is illustrated in FIG. 4. A typical gear hobbing process is illustrated in FIG. 5. This gear hobbing step uses a multipoint cutting tool called a gear hob 30. It looks like a worm gear which has a plurality of straight flutes 32 all around its periphery parallel to its axis 33. The flutes 32 are so shaped by giving proper angles to them so that they work as cutting edges. The gear hob 30 is rotated at a suitable speed and is simultaneously fed to the gear blank 34 which is also revolving with the speeds of rotation being constant and synchronized so that for each revolution of the gear hob 30 the gear blank rotates by a distance which is equal to one pitch distance of the desired gear face. The hob teeth 31 act like screw threads having a definite helix angle. During operation the hob is tilted to the helix angle so that its cutting edges remain square with the gear blank.

Disc cutting utilizes a cutting disc, also known as a cut-off wheel, which typically has a circular diamond coated blade or a resin-bonded abrasive cutting wheel. Resin-bonded abrasive cutting wheels that can be used are normally comprised of an abrasive mix of grit and adhesive that is formed into a thin rigid disc. The disc is normally reinforced with fiber webbing for increased strength.

While certain representative embodiments and details have been shown for the purpose of illustrating the subject invention, it will be apparent to those skilled in this art that various changes and modifications can be made therein without departing from the scope of the subject invention.

What is claimed is:

1. A method for manufacturing a combination gear or a compound gear having a larger diameter gear face and a smaller diameter gear face, said method consisting of the sequential steps of (1) molding a powder metal composition into a green preform having the smaller diameter gear face and a larger diameter cylindrical blank face, wherein the powder metal composition is molded into the green preform under a pressure which is within the range of 40 tsi to 70 tsi, (2) subsequently machining the larger diameter cylindrical blank face of the green preform into the larger diameter gear face, and (3) subsequently sintering the green preform having the larger diameter gear face to form the combination gear or the compound gear.

2. The method as specified in claim 1 wherein the gear is a combination gear.

3. The method as specified in claim 1 wherein the gear is a compound gear.

4. The method as specified in claim 1 which comprises hobbing the larger diameter cylindrical blank face to form the larger diameter gear face.

5. The method as specified in claim 1 which comprises milling the larger diameter cylindrical blank face to form the larger diameter gear face.

6. The method as specified in claim 1 which comprises disc cutting the larger diameter cylindrical blank face to form the larger diameter gear face.

7. The method as specified in claim 1 wherein the gear has a smaller diameter helical gear face and a larger diameter helical gear face, and wherein the smaller diameter gear face and the larger diameter gear face have different helix angles.

8. The method as specified in claim 1 wherein the gear has a smaller diameter helical gear face and a larger diameter helical gear face, and wherein the smaller diameter gear face and the larger diameter gear face are of different helix directions.

9. The method of claim 1 wherein the green preform is sintered under a protective atmosphere which is selected from the group consisting of a nitrogen atmosphere, a hydrogen atmosphere, and a carburizing atmosphere; and wherein the part is sintered in a sintering furnace at a temperature which is within the range of 1700° F. to 2450° F.

* * * * *